United States Patent [19]

Coffee

[11] Patent Number: 4,619,438
[45] Date of Patent: Oct. 28, 1986

[54] VALVE

[75] Inventor: Ronald A. Coffee, Haslemere, England

[73] Assignee: Imperial Chemical Industries PLC, London, England

[21] Appl. No.: 179,438

[22] Filed: Aug. 19, 1980

[30] Foreign Application Priority Data

Sep. 10, 1979 [IE] Ireland .................................. 1711/79
Mar. 20, 1980 [GB] United Kingdom ................. 8009499

[51] Int. Cl.⁴ ............................................. F16K 31/02
[52] U.S. Cl. ........................... 251/129.01; 251/129.08; 251/144
[58] Field of Search ........................ 251/129, 141, 144

[56] References Cited

U.S. PATENT DOCUMENTS 3,405,728 10/1968 Dexter .
3,416,549 12/1968 Chaney et al. .
3,587,613 6/1971 Mark .
4,005,733 2/1977 Riddel ................................. 251/141

FOREIGN PATENT DOCUMENTS 599652 6/1960 Canada ................................. 251/129
2294535 7/1976 France .
825548 12/1959 United Kingdom .
465513 6/1975 U.S.S.R. ............................. 251/129
482568 6/1976 U.S.S.R. ............................. 251/141

Primary Examiner—Arnold Rosenthal
Attorney, Agent, or Firm—Cushman, Darby & Cushman

[57] ABSTRACT

A valve comprises a port for the passage of fluid, a plug for interrupting the flow of fluid through the port mechanically biased into a closed position, and means for creating an electrostatic field for causing the plug to move relative to the port so as to open the valve.

4 Claims, 2 Drawing Figures

VALVE

The present invention relates to valves.

Numerous mechanical means are known for stopping or limiting the flow of liquid through a pipe or orifice. A typical example is the domestic tap. With increasing automation and control of systems and devices by electronic computers, it is convenient to have valves which are readily operated electrically. Taps or stopcocks can be, and frequently are, operated by electrical relays or servomechanisms, but these are generally awkward and cumbersome, relatively expensive, and in particular do not readily lend themselves to cheap and convenient miniaturisation when relatively small flows of liquid are involved.

We have now devised a valve which is electrically operable, simple in design and readily miniaturised. It operates by means of electrostatic forces.

According to the present invention we provide a valve comprising a port for the passage of fluid, a plug for interrupting the flow of fluid through the port, mechanically biased into a position closing the port and seating therein, and means for creating an electrostatic field for causing the plug to move relative to the port into a position in which the port is at least partially open.

The plug may be mechanically biased by spring-biasing, or by other mechanical means, e.g. gravity or liquid pressure.

The electrostatic field may move the plug by electrostatic attraction, or by electrostatic repulsion; or a combination of the two. In simpler devices it is preferred to use electrostatic repulsion. Since electrostatic forces vary inversely as the square of the distance between charged objects, inertia is easier to overcome, and the valve less prone to stick, if the force is initially at a maximum and decreases as the plug moves, as will be the case with repulsion, rather than vice versa, as with attraction.

A specific embodiment of the invention will now be described with reference to the drawings, in which.

Figure 1:
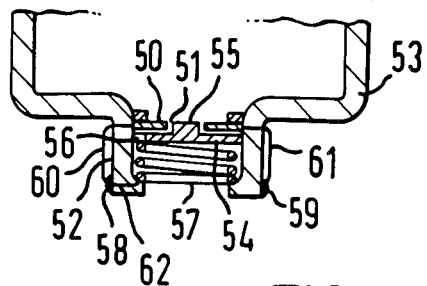
FIG. 1 is a vertical section through a valve according to the invention.
Figure 2:
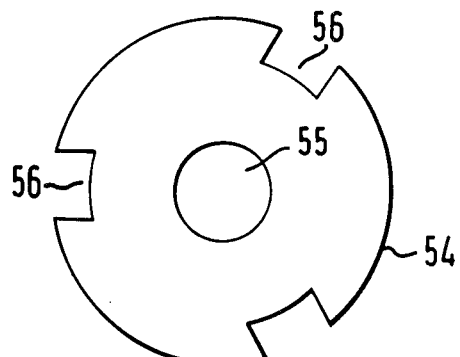
FIG. 2 is a plan view of plate 54 shown in FIG. 1.

In the described embodiment, a valve according to the invention is provided in the neck of a container containing an organic liquid pesticide formulation, for use in electrostatic spraying.

The valve comprises a metal plate (50) with a central port (51) mounted in the neck (52) of the container (53). Below the plate (50) is a second plate (54), shown in plan in FIG. 2. It has a central boss (55) which fits within the port (51) of plate (50) and acts as a plug, closing it against passage of liquid. Plate (54) has peripheral slots (56), and is urged against plate (50) by a compression spring (57). Metal plates (50) and (54) are coated, on their lower and upper surfaces respectively, with a thin layer of a dielectric (epoxide resin). Contacts (58) and (59) on the outside of the neck (52) are electrically connected via the metal plate (50) and conductors (60) and (61). Contact (58) is also connected to plate (54) via conductor (62) and spring (57). In operation, the container (53) is mounted on a spraying apparatus (not shown) in fluid-tight engagement with a conduit leading to an electrostatic spary-head. Contacts (58) and (59) are thereby connected respectively to the output terminal of a high voltage generator and to the conducting surface of the electrostatic spray-head. A potential of about 20 kilovolts is thus applied to plates (50) and (54). This potential forces the plates apart by electrostatic repulsion against the action of the spring (57), and liquid flows from the container (53) through the port (51) and slots (56) into the apparatus for delivery to the spray-head. At the same time the spray-head receives a potential appropriate to atomise the liquid being delivered to it. Without the container on the apparatus, the electrostatic valve cannot open, and neither can potential be transmitted to the electrostatic spray-head.

The foregoing description of the specific embodiment in a specific application illustrates one advantage of the invention. The container of potentially toxic pesticide is effectively tamper-proof when not in use, because of the need for application of a high potential to open the valve. Electrostatic valves according to our invention are particularly useful in containers of the type described, and may also be conveniently used in other electrostatic spraying applications, e.g. in spraylines, since in such applications a source of high voltage is necessarily readily available.

Valves of the type illustrated are most useful in controlling the flow of gases and relatively non-polar liquids. Polar liquids (particularly water) may be found to upset their functioning. For applications where this is inconvenient, it is possible to design valves in which the liquid does not come into contact with these parts of the plug (or port) which are electrostatically charged.

The valve illustrated in FIGS. 1 and 2 may be adapted to become progressive, if the boss (55) is replaced by a conical projection fitting into a conical recess replacing the port (51) illustrated. If then the applied voltage is varied, the force between plates (50) and (54) will vary correspondingly, as will the compression of the spring (57) and hence the space for liquid to flow between the conical projection and recess. In this way, liquid flows can be progressively controlled according to the applied voltage. Devices of this type may have diverse applications, for example in electrostatic spraying, and in fuel carburation in motor vehicles. An alternative way of obtaining a progressive action is by using a butterfly valve, of the type commonly used in motor vehicles to control gas flow. A cylindrical tube is closed by a circular disc of diameter slightly less than the internal diameter of the tube. The disc is mounted transversely, so as to pivot about a diameter of the disc (which is also a diameter of the tube). The disc is rotationally spring-biased against stops in the walls of the tube. Charging both stops and disc to a high potential causes the disc to rotate back against the spring, to a degree depending on the potential, and permits fluid to pass through the valve. Similarly, other known designs of valve may be adapted for electrostatic actuation according to our invention.

I claim:

1. A valve comprising:

means defining a port for the passage of fluid;

an electrostatically neutral plug for interrupting the flow of fluid through the port;

means for mechanically biasing said plug into a position closing the port, seating on said means defining the port, said means defining said port comprising a first metal plate having a port formed thereon, and said plug comprising a second metal plate, insulated from said first metal plate, and having a boss upstanding from one face of said second metal plate and dimensioned to be received within the port; and means for applying a high electrostatic potential of the same sign to both said plug and said means defining the port, so that an electrostatic field between said plug and said means defining the port sufficient to cause said plug to move away from and open the port, and allow fluid passage therethrough, is provided.

2. A valve as recited in claim 1 wherein said mechanical biasing means comprises a spring engaging a face of said second metal plate opposite said face from which said boss extends, and biasing said boss so that it passes into the port.

3. A valve as recited in claims 1 or 2 wherein said second metal plate is circular and has a plurality of peripheral slots formed therein through which fluid can flow from the port when the port is open.

4. A valve as recited in claim 3 wherein the port is circular and wherein said boss is circular in cross-section.

* * * * *